(12) United States Patent
Sattler et al.

(10) Patent No.: US 7,805,669 B2
(45) Date of Patent: Sep. 28, 2010

(54) SYSTEM AND METHOD FOR SELECTIVE FORM CONFIGURATION

(75) Inventors: Juergen Sattler, Wiesloch (DE); Olaf Meincke, Heidelberg (DE); Joachim Gaffga, Wiesloch (DE)

(73) Assignee: SAG AG, Walldorf (DE)

( * ) Notice: Subject to any disclaimer, the term of this patent is extended or adjusted under 35 U.S.C. 154(b) by 905 days.

(21) Appl. No.: 11/643,780

(22) Filed: Dec. 22, 2006

(65) Prior Publication Data

US 2008/0155391 A1   Jun. 26, 2008

(51) Int. Cl.
G06F 17/00 (2006.01)
(52) U.S. Cl. ................... 715/223; 715/221; 715/222
(58) Field of Classification Search .................. 715/223
See application file for complete search history.

(56) References Cited

U.S. PATENT DOCUMENTS

| | | | | |
|---|---|---|---|---|
| 6,546,397 | B1 * | 4/2003 | Rempell | 707/102 |
| 7,376,891 | B2 * | 5/2008 | Hitchock et al. | 715/221 |
| 7,500,178 | B1 * | 3/2009 | O'Donnell | 715/221 |
| 7,590,932 | B2 * | 9/2009 | Britton et al. | 715/222 |
| 7,610,548 | B1 * | 10/2009 | Brinkman et al. | 715/221 |
| 7,712,022 | B2 * | 5/2010 | Smuga et al. | 715/221 |
| 2001/0054046 | A1 * | 12/2001 | Mikhailov et al. | 707/500 |
| 2002/0194219 | A1 * | 12/2002 | Bradley et al. | 707/506 |
| 2003/0018481 | A1 * | 1/2003 | Zhou et al. | 705/1 |
| 2003/0126555 | A1 * | 7/2003 | Aggarwal et al. | 715/505 |
| 2003/0188260 | A1 * | 10/2003 | Jensen et al. | 715/505 |
| 2003/0188261 | A1 * | 10/2003 | Smith et al. | 715/505 |
| 2004/0039989 | A1 * | 2/2004 | Warren | 715/505 |
| 2004/0143790 | A1 * | 7/2004 | Ding et al. | 715/506 |
| 2004/0153965 | A1 * | 8/2004 | O'Rourke | 715/505 |
| 2004/0237030 | A1 * | 11/2004 | Malkin | 715/505 |
| 2005/0071752 | A1 * | 3/2005 | Marlatt | 715/506 |
| 2007/0271085 | A1 * | 11/2007 | Hamdi et al. | 703/27 |

* cited by examiner

*Primary Examiner*—Doug Hutton
*Assistant Examiner*—Zaida I Marrero
(74) *Attorney, Agent, or Firm*—Kenyon & Kenyon LLP

(57) ABSTRACT

A system and method for selective form configuration. According to an embodiment of the invention, an engine retrieves a form template from a data store, the form template specifying a plurality of form elements, parses the form template to identify one or more configurable form elements from the plurality of form elements, presents to a user via a user interface one or more selectable options specifying configuration settings to govern modifications of the one or more identified configurable form elements, receives from the user interface a selection of the one or more options provided by the user, generates a descriptor identifying the selected options provided by the user, and associates the descriptor with the form template.

20 Claims, 4 Drawing Sheets

SYSTEM AND METHOD FOR SELECTIVE FORM CONFIGURATION

BACKGROUND OF THE INVENTION

Throughout a myriad of computer systems and applications, the use of forms has become a common and convenience way to present and receive data in a structured format. The popularity of forms, such as those generated in the ubiquitous PDF format for example, has led to the development of increasingly complex and involved software tools directed to the creation and configuration of forms. Such tools are conventionally referred to as form builders or form designers.

Unfortunately, the complexity of current form builders and form designers can be overwhelming to users who have limited requirements for form configuration, such as configuring pre-defined form elements in a form template in order to accommodate a particular application.

Accordingly, there is a need in the art for a system and method that reduces the complexity of form configuration.

DETAILED DESCRIPTION

Embodiments of the present invention reduce the complexity of form configuration by allowing a restricted set of simple modification options to be pre-configured for individual form templates (e.g., data structures that define how subsequent forms, based on the templates, are to be generated and utilized). The subsequent configuration of the individual form templates is greatly simplified because it is governed by these simple pre-configured modification options.

Figure 1:
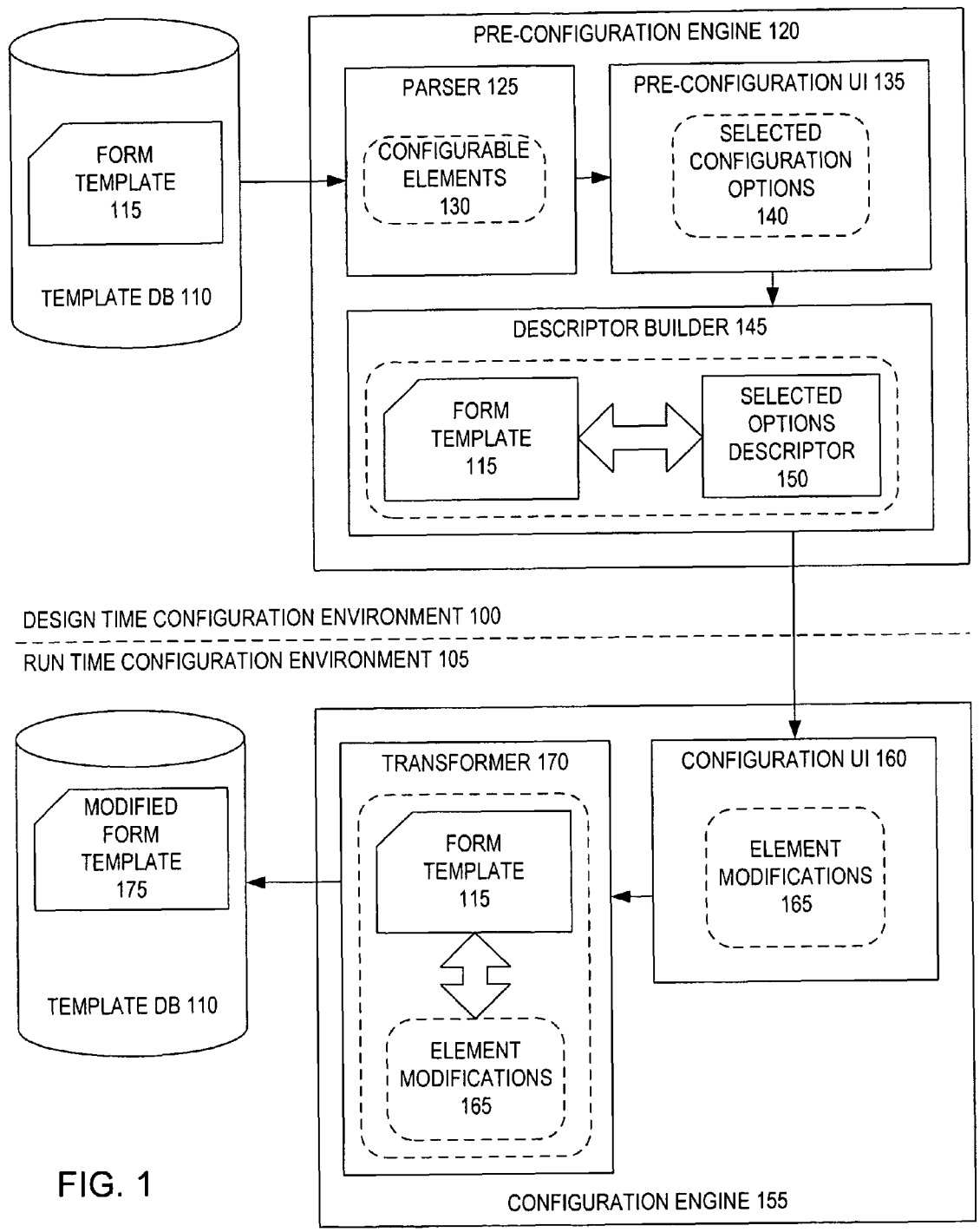
FIG. 1 is a block diagram that depicts a system architecture in accordance with an embodiment of the present invention.

FIG. 1 portrays a design time (100) and run time (105) configuration environment in accordance with an embodiment of the present invention. The design time environment (100) may operate in accordance with the steps of FIG. 2, and the run time environment (105) may operate in accordance with the steps of FIG. 3. The design time environment (100) allows for modification options to be configured in connection with a form template, and the run time environment (105) allows for the configuration of the form template in accordance with the configured modification options.

In connection with the design time configuration environment (100), in order to allow a restricted set of simple modification options to be pre-configured for individual form templates as described above, a pre-configuration engine (120) may first retrieve a form template (115) from a data store (110) such as a database. A parser (125) may then analyze the form template (115) to identify whether any of the form elements defined within the template are configurable by the run time environment (105) (step 200).

In order to simplify the configuration process, the pre-configuration engine (120) may support the configuration of only a subset of elements that may otherwise be configurable in a native form designer. In this manner, in analyzing the form template (115) the parser (125) may identify the configurable elements (130) by comparing all of the form elements in the template against a list of pre-defined but restricted set of supported elements.

If configurable form elements (130) are discovered, then the pre-configuration engine (120) may invoke a user interface (135) to display configuration options to be selected by a user for those elements (step 210). The configuration options specify configuration settings that are to govern any modification of the configurable elements (130) to be permitted by the run time environment (105). The user interface (135) may display the options in any number of ways, such as in a listing along with a listing or display of corresponding elements (130) to which they correspond.

The selectable configuration options may include, for example, whether or not to enable an element (130) for modification, position an element (130), change values of an element (130), define a range within which a value of an element (130) may be changed, enable a table element (130) for modification, enable a column of a table element (130) for modification, position a column of a table element (130) for modification, modify a header of a column of a table element (130) for modification, and modify an order of columns of a table element (130) for modification.

Once the pre-configuration engine (120) receives the user's selected configuration options (140) through the user interface (135) (step 220), a descriptor builder (145) may generate a descriptor (150) identifying the user-selected options (140) (step 230). The descriptor may include any data representation of the user-selected options (140), such as XML-formatted text for example. The builder (145) may associate the descriptor (150) with the form template (115) (step 240) and store them in the data store (110).

The association of the descriptor (150) with the form template (115) may be via lookup table (e.g., the descriptor (150) and template (115) are stored as distinct files, but their association can be identified by querying a lookup table) or involve the descriptor (150) being embedded within the form template (115) for example.

In connection with the run time configuration environment (105), in order to enforce the configuration of the form template in accordance with the configured modification options (140), a configuration engine (155) may first retrieve the stored form template (115) and associated descriptor (150) from the data store (110), and parse the associated descriptor (150) to identify the user-selected configuration options (140) (step 300).

The configuration engine (155) may next invoke a user interface (160) to allow a user to make modifications to the configurable form elements (130) of the form template (110) in accordance with the user-selected options (140) identified in the descriptor (150) (step 310).

Once the configuration engine (155) receives the user's element modifications (165) through the user interface (160) (step 320), a transformer (170) may apply the modifications (165) to the form template (115) (step 330), and store the modified form template (175) in the data store (110). In order for the transformer (170) to apply the modifications, it may require an installed understanding of the native format of the form template (115) and how to alter the content of the template (115) to effect the modifications (165).

Additionally, the user interfaces (135) and (160) may be generated in any format, including the HTML format for example.

Figure 4:
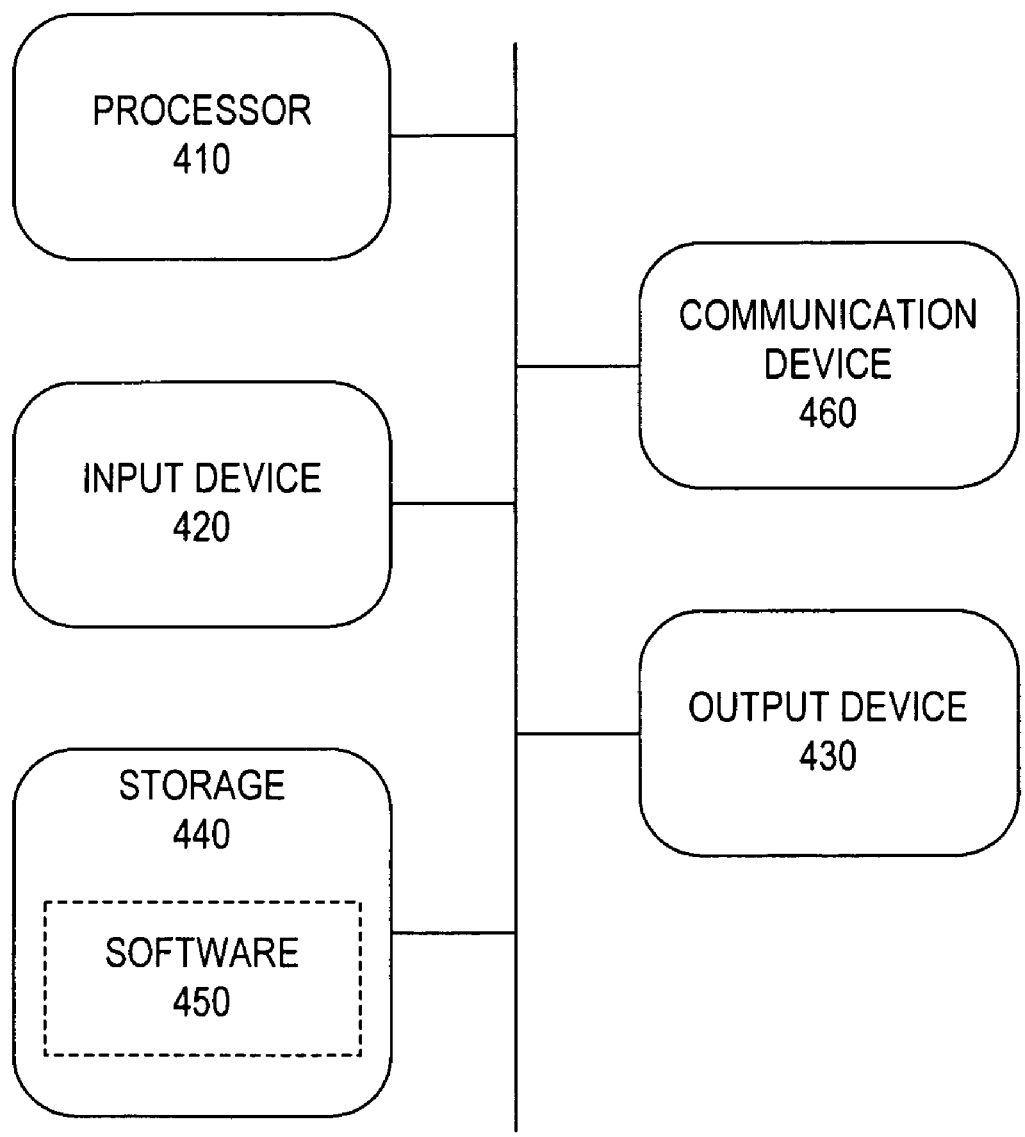
FIG. 4 is a block diagram that depicts a computing device in accordance with an embodiment of the present invention.

FIG. 4 illustrates the components of a basic computing device in accordance with an embodiment of the present invention, which may run the pre-configuration engine (120)

and configuration engine (155). The computing device may be a workstation, server, personal computer, handheld computing device, or any other type of microprocessor-based device. The computing device may include one or more of a processor (410), input device (420), output device (430), storage (440), and communication device (460).

The input device (420) may include a keyboard, mouse, pen-operated touch screen or monitor, voice-recognition device, or any other device that provides input. The output device (430) may include a monitor, printer, disk drive, speakers, or any other device that provides output.

The storage (440) may include any volatile and/or nonvolatile data storage, including one or more electrical, magnetic or optical memories such as a RAM, cache, hard drive, CD-ROM drive, tape drive or removable storage disk. Communication device 460 may include a modem, network interface card, or any other device capable of transmitting and receiving signals over a network. The components of the computing device may be connected in any manner, such as via electrical bus or wirelessly.

The software (450), which may be stored in the storage (440) and executed by the processor (410), may include, for example, the application programming that embodies the functionality of the present invention (e.g., as embodied in the pre-configuration engine (120) and configuration engine (155) and their corresponding components). The software (450) may include a combination of client applications and enterprise servers such as an application server and a database server.

Communications in connection with the present invention may occur over any type of interconnected communication system/network, may implement any communications protocol, and may be secured by any security protocol. Corresponding network links may include telephone lines, DSL, cable networks, T1 or T3 lines, wireless network connections, or any other arrangement that implements the transmission and reception of network signals.

The computing device may implement any operating system, such as Windows or UNIX. The software (450) may be written in any programming language, such as ABAP, C, C++, Java or Visual Basic. In various embodiments, application software embodying the functionality of the present invention may be deployed on a standalone machine, in a client/server arrangement or through a Web browser as a Web-based application or Web service, for example.

Several embodiments of the invention are specifically illustrated and/or described herein. However, it will be appreciated that modifications and variations of the invention are covered by the above teachings and within the purview of the appended claims without departing from the spirit and intended scope of the invention.

Figure 2:
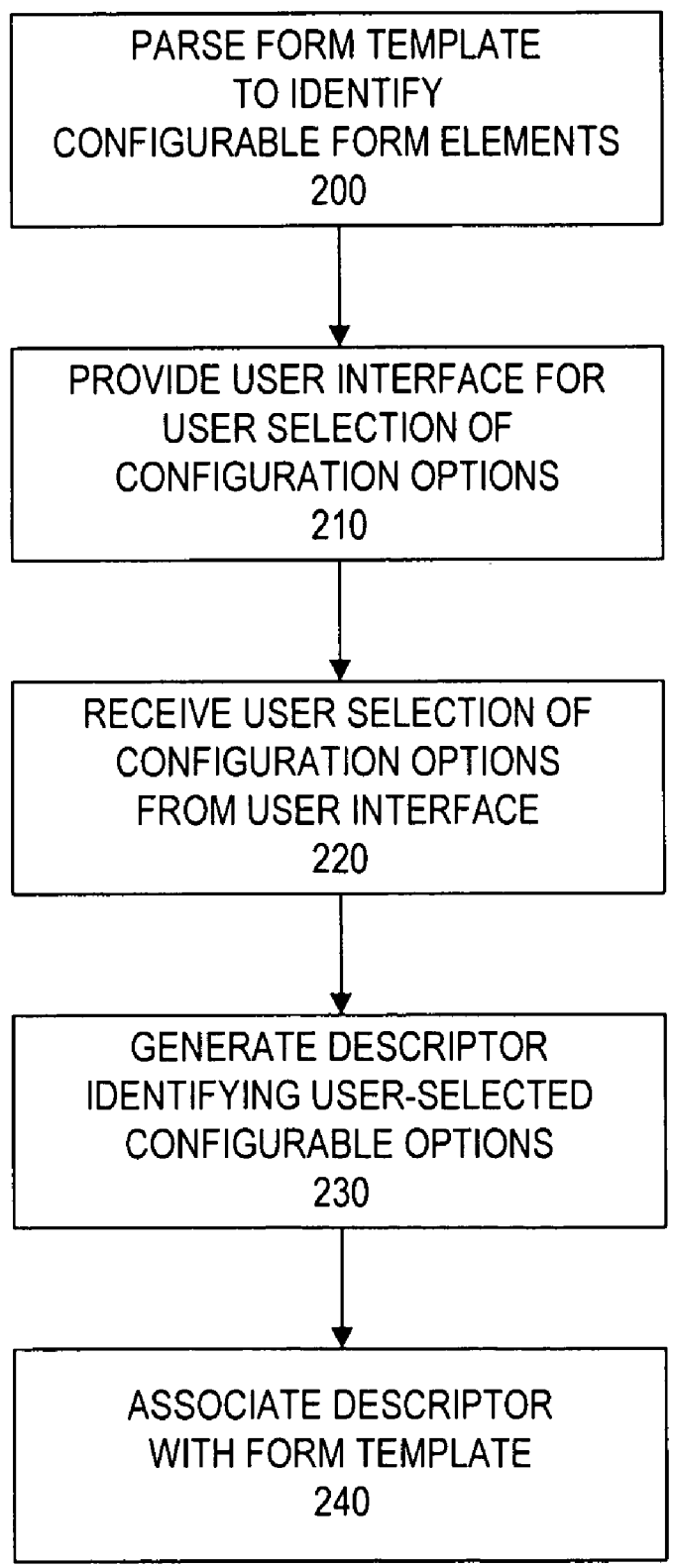
FIG. 2 is a process flow diagram that depicts an pre-configuration process in accordance with an embodiment of the present invention.
Figure 3:
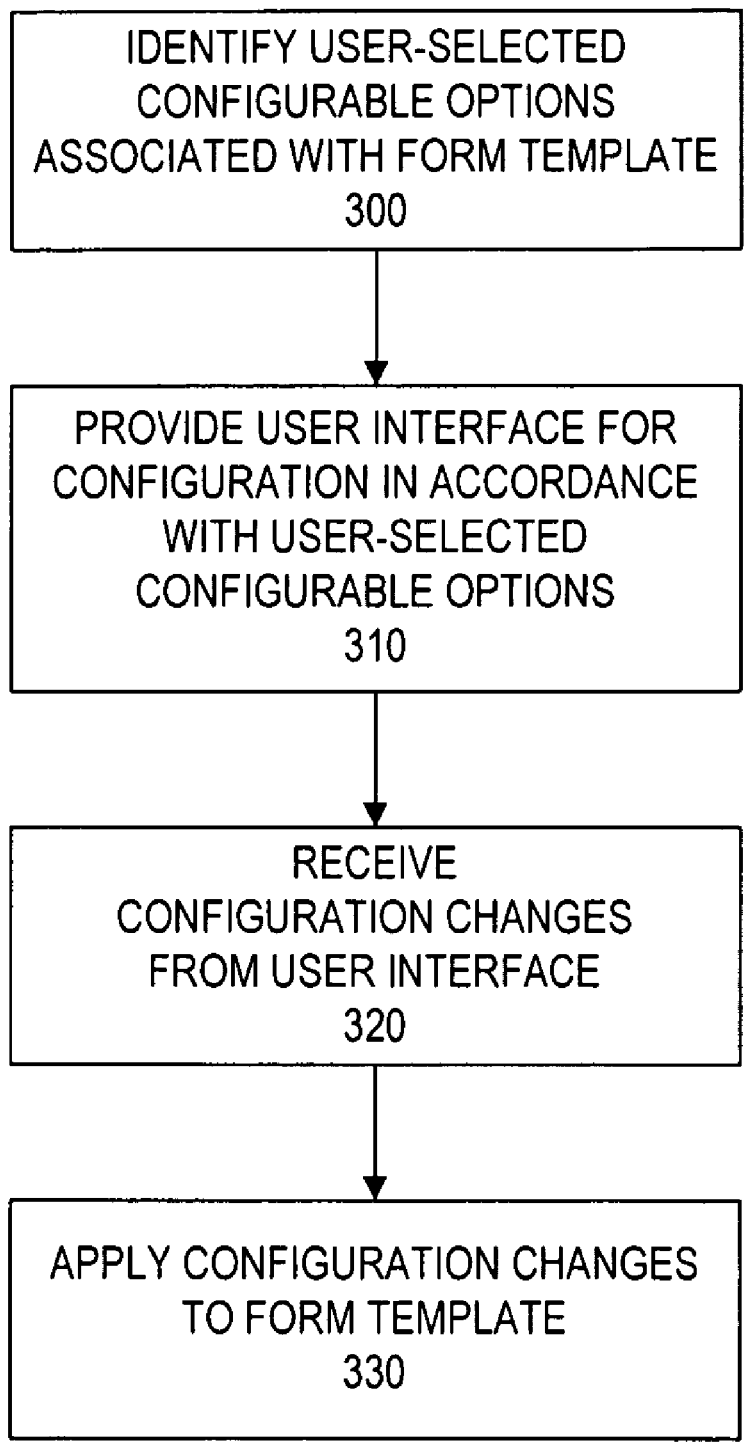
FIG. 3 is a process flow diagram that depicts an configuration process in accordance with an embodiment of the present invention.

For example, software components that may implement embodiments of the present invention such as pre-configuration engine (120) and configuration engine (155) may comprise several discrete modules (other than those shown in FIG. 1) that together still provide the same functionality, data specified in the illustrated data store (110) may be spread over several databases and/or systems, and the flow diagram of FIGS. 2 and 3 may encompass combined steps or several intermediate steps that do not detract from the higher level functionality described therein. Additionally, the pre-configuration engine (120) and configuration engine (155) may be configured as distinct engines or as a single engine.

What is claimed is:

1. A method for form template pre-configuration, comprising:

retrieving a form template from a data store, the form template specifying a plurality of form elements;

parsing the form template to identify one or more configurable form elements from the plurality of form elements;

presenting to a user via a user interface one or more selectable options specifying configuration settings to govern modifications of the one or more identified configurable form elements;

receiving from the user interface a selection of the one or more options provided by the user;

generating a descriptor identifying the selected options provided by the user;

associating the descriptor with the form template;

storing the form template and associated descriptor in the data store;

retrieving the stored form template and associated descriptor from the data store, parsing the associated descriptor to identify the selected options provided by the user, providing a run time configuration user interface to allow modifications to the one or more configurable form elements of the form template in accordance with the user-selected options identified in the descriptor, receiving from the run time configuration user interface modifications to the one or more configurable form elements of the form template in accordance with the user-selected options identified in the descriptor, applying the modifications to the form template, and storing the modified form template in the data store.

2. The method of claim 1, wherein at least one of the one or more selectable options specifies whether or not to enable at least one of the one or more identified configurable form elements for modification.

3. The method of claim 1, wherein at least one of the one or more selectable options specifies whether or not to position at least one of the one or more identified configurable form elements.

4. The method of claim 1, wherein at least one of the one or more selectable options specifies whether or not to change values of at least one of the one or more identified configurable form elements.

5. The method of claim 1, wherein at least one of the one or more selectable options specifies whether or not to define a range within which a value of at least one of the one or more identified configurable form elements may be changed.

6. The method of claim 1, wherein at least one of the one or more identified configurable form elements includes a table.

7. The method of claim 6, wherein at least one of the one or more selectable options specifies whether or not to enable the table for modification.

8. The method of claim 6, wherein at least one of the one or more selectable options specifies whether or not to enable a column of the table for modification.

9. The method of claim 6, wherein at least one of the one or more selectable options specifies whether or not to position a column of the table for modification.

10. The method of claim 6, wherein at least one of the one or more selectable options specifies whether or not to modify a header of a column of the table for modification.

11. The method of claim 6, wherein at least one of the one or more selectable options specifies whether or not to modify an order of columns of the table for modification.

12. The method of claim 1, wherein the descriptor is embedded within the form template.

13. The method of claim 1, wherein the descriptor is associated with the form template via a lookup table.

14. The method of claim 1, wherein the user interface is presented via an HTML format.

15. A system for selective form configuration, comprising:
a data store;
a pre-configuration engine communicatively linked to the data store, wherein the pre-configuration engine
retrieves a form template from the data store, the form template specifying a plurality of form elements,
parses the form template to identify one or more configurable form elements from the plurality of form elements,
presents to a user via a design time configuration user interface one or more selectable options specifying configuration settings to govern modifications of the one or more identified configurable form elements,
receives from the design time configuration user interface a selection of the one or more options provided by the user,
generates a descriptor identifying the selected options provided by the user,
associates the descriptor with the form template, and
stores the form template and associated descriptor in the data store; and
a configuration engine communicatively linked to the data store, wherein the configuration engine
retrieves the stored form template and associated descriptor from the data store,
parses the associated descriptor to identify the selected options provided by the user,
provides a run time configuration user interface to allow modifications to the one or more configurable form elements of the form template in accordance with the user-selected options identified in the descriptor,
receives from the run time configuration user interface modifications to the one or more configurable form elements of the form template in accordance with the user-selected options identified in the descriptor,
applies the modifications to the form template, and
stores the modified form template in the data store.

16. The system of claim 15, wherein at least one of the one or more selectable options specifies whether or not to enable at least one of the one or more identified configurable form elements for modification.

17. The system of claim 15, wherein at least one of the one or more selectable options specifies whether or not to position at least one of the one or more identified configurable form elements.

18. The system of claim 15, wherein at least one of the one or more selectable options specifies whether or not to change values of at least one of the one or more identified configurable form elements.

19. The system of claim 15, wherein the descriptor is associated with the form template via a lookup table.

20. The system of claim 15, wherein the run time configuration user interface is provided via an HTML format.

* * * * *

UNITED STATES PATENT AND TRADEMARK OFFICE
CERTIFICATE OF CORRECTION

PATENT NO. : 7,805,669 B2
APPLICATION NO. : 11/643780
DATED : September 28, 2010
INVENTOR(S) : Sattler et al.

It is certified that error appears in the above-identified patent and that said Letters Patent is hereby corrected as shown below:

On The Title Page

At Item (73), change "Assignee: SAG AG, Walldorf (DE)" to
--Assignee: SAP AG, Walldorf (DE)--

Signed and Sealed this
Fifteenth Day of May, 2012

David J. Kappos
*Director of the United States Patent and Trademark Office*